United States Patent [19]

Jeroszko

[11] 3,973,390

[45] Aug. 10, 1976

[54] COMBUSTOR EMPLOYING SERIALLY STAGED PILOT COMBUSTION, FUEL VAPORIZATION, AND PRIMARY COMBUSTION ZONES

[75] Inventor: Ronald A. Jeroszko, Hebron, Conn.

[73] Assignee: United Technologies Corporation, Hartford, Conn.

[22] Filed: Dec. 18, 1974

[21] Appl. No.: 533,921

[52] U.S. Cl. ............................ 60/39.06; 60/39.65; 60/39.71; 60/DIG. 11; 60/39.74 R; 431/10
[51] Int. Cl.² ...................... F02C 3/22; F02M 23/00
[58] Field of Search ......... 60/39.71, 39.74 R, 39.65, 60/39.74 B, 39.06, DIG. 11; 431/10

[56] References Cited
UNITED STATES PATENTS

| | | | |
|---|---|---|---|
| 2,922,279 | 1/1960 | Roberson et al. | 60/39.71 |
| 2,955,420 | 10/1960 | Schirmer | 60/39.71 |
| 2,959,006 | 11/1960 | Ferrie | 60/39.71 |
| 3,046,731 | 7/1962 | Cambel et al. | 60/261 |
| 3,055,179 | 9/1962 | Lefebvre et al. | 60/39.71 |
| 3,074,668 | 1/1963 | Frenzl | 60/39.71 |
| 3,531,937 | 10/1970 | Sneeden | 60/39.71 |
| 3,788,065 | 1/1974 | Markowski | 60/39.74 R |
| 3,792,581 | 2/1974 | Handa | 60/39.65 |
| 3,820,324 | 6/1974 | Grindley et al. | 60/39.71 |
| 3,872,664 | 3/1975 | Lohmann et al. | 60/39.65 |

*Primary Examiner*—Carlton R. Croyle
*Assistant Examiner*—Robert E. Garrett
*Attorney, Agent, or Firm*—Vernon F. Hauschild

[57] ABSTRACT

A low emission combustion chamber in which a premixed, fuel rich-air mixture is discharged uniformly into the hot products of combustion of a pilot combustion zone to be vaporized thereby and to flow therewith as a non-autoignitable, vaporized, fuel rich-air mixture into the main combustion zone where combustion air is added thereto in swirling form for rapid mixing, autocombustion and burning therewith for low emission results.

16 Claims, 4 Drawing Figures

COMBUSTOR EMPLOYING SERIALLY STAGED PILOT COMBUSTION, FUEL VAPORIZATION, AND PRIMARY COMBUSTION ZONES

CROSS-REFERENCE TO RELATED APPLICATIONS

Some of the subject matter disclosed or discussed herein is also disclosed or discussed in a patent application filed on even date herewith in the name of Markowski and Rielly and entitled "Low Emission Combustion Chamber", U.S. Ser. No. 534,018 filed Dec. 18, 1974 and in a second application filed on even date herewith in the name of Markowski and Nolan entitled "Low Emission Combustion Chamber", U.S. Ser. No. 533,922 filed Dec. 18, 1974.

BACKGROUND OF THE INVENTION

1. Field of the Invention

This invention relates to combustion chambers and more particularly to combustion chambers using swirl or vorbix burning and wherein low emission combustion is accomplished by uniformly injecting a premixed, fuel rich-air mixture into a pilot combustion zone for vaporization therein and discharged therefrom to a main combustion chamber to be mixed with swirling main combustion air to bring the oxygen content thereof to the autoignitable level for rapid diffusion burning in the main combustion chamber so as to produce minimum emission products.

2. Description of the Prior Art

In the combustion art, swirl burning and vorbix burning have been used both to accelerate mixing and combustion of fuel and air and to accelerate mixing of products of combustion and cooling air during the dilution process, as in Markowski U.S. Pat. Nos. 3,701,255; 3,747,345; 3,788,065; 3,792,582; and 3,811,277; Lewis U.S. Pat. No. 3,675,419 and U.S. Pat. No. 3,872,664 in the names of Markowski and Lohmann and entitled "A Swirl Combustor with Vorbix Burning and Mixing", but these prior art swirl and vorbix burners do not use selective swirl or vorbix burning to effect low emission combustion in the manner described herein.

SUMMARY OF THE INVENTION

It is a primary object of this invention to teach a combustion chamber apparatus and method to accomplish the advantages of a premixing of fuel and air before admission to the combustion chamber and diffusion burning following flash vaporization so as to produce low emission combustion.

It is still a further object to provide a combustion chamber which produces uniform mixing of the fuel and air for prevaporization thereof before admission into the main combustion chamber and for the swirling ejection of primary combustion air thereinto in the main combustion chamber to effect autoignition and rapid combustion thereof in a high velocity environment.

This combustion chamber has improved high power burning through minimal disturbance to the flow field and has improved low power emission combustion by having the premixed secondary fuel-air mixture injected in a burnable range.

This combustion chamber comprises a three passage system, namely, a premixed hot pilot zone, a premixed fuel rich secondary fuel-air zone, and a cold, swirling primary combustion air supply zone.

A feature of this combustion chamber is that the premixed, secondary fuel-air mixture is injected at an equivalence ratio (hereinafter ER) of about three or four, where an equivalence ratio is the ratio of the fuel-air mixture under consideration in relation to the stoichiometric fuel-air mixture, which has an ER of one, to eliminate the high emission burning at low power and low secondary flow and to avoid coking at high power encountered with conventional premixed fuel-air mixtures of ER equal to or less than one.

This combustion chamber has improved low power emission because the secondary fuel acts as a flameholder and has an improved combustion pattern factor at high power because the secondary fuel injection causes less disturbance to the flow field and flash vaporizes.

A further feature of this combustion chamber is that a flameholder is used to hold flame in the pilot combustion zone and wherein approximately one quarter of the total fuel admitted to the combustion chamber enters the pilot combustion zone premixed at an ER of about one, wherein the secondary fuel is premixed with air and wherein this premixed fuel-air mixture is uniformly injected into the downstream end of the pilot combustion zone at a high ER of about three or four, depending upon engine requirements, and wherein primary combustion air is mixed with the secondary fuel, which has been vaporized by the pilot zone products of combustion, in the main combustion chamber for autoignition therein and rapid diffusion combustion therein.

This is a combustion chamber wherein the pilot and main combustion zones are joined annular chambers, wherein the premixed secondary fuel-air mixture is introduced to the annular pilot combustion zone through a plurality of circumferentially spaced and oriented apertures as radially oriented streams, and wherein the primary combustion air is directed into the main combustion chamber through a plurality of circumferentially spaced and oriented swirler members.

This burner avoids fuel droplet burning.

This is a combustion chamber in which the pilot and main combustion zones are joined annuli, wherein a premixed, high ER fuel-air mixture is directed into the pilot zone products of combustion in swirling fashion for flash vaporization therein, and wherein the main combustion air is injected into the vaporized fuel-air mixture in swirling fashion in the main combustion chamber.

This is a combustion chamber of minimum axial dimension and wherein both pilot fuel and secondary fuel are injected premixed with air, as a fuel-air mixture of selected ER, and wherein swirling combustion takes place in both the pilot and main combustion zones.

This is still further a combustion chamber in which both the pilot fuel-air mixture and the secondary fuel-air mixture are premixed and introduced into their respective combustion zones in swirling fashion about the combustion chamber axis.

This is also a combustion chamber in which the premixed, secondary fuel-air ratio mixture is passed through conduits adjacent the pilot combustion zone so as to assist in the rapid vaporization thereof.

It is a further feature of this combustion chamber that the premixed secondary fuel rich-air mixture is injected into hot pilot exhaust gases for flash vaporization of the fuel and under conditions which establish an ignition lag and, further, wherein the vaporized, fuel rich-air mixture so formed is introduced into the main combustion zone in swirling fashion where it mixes with swirling combustion air so as to provide molecular mixing between the fuel and air and so as to increase the oxygen content of the mixture to a point where autoignition will occur in the main combustion zone with the mixture in the main combustion zone at an ER less than one and sooner than would have been the case if the pilot zone mixture ignition lag had been permitted to run full term.

Other objects and advantages of the present invention may be seen by referring to the following description and claims, read in conjunction with the accompanying drawings.

DESCRIPTION OF THE PREFERRED EMBODIMENT

Figure 1:
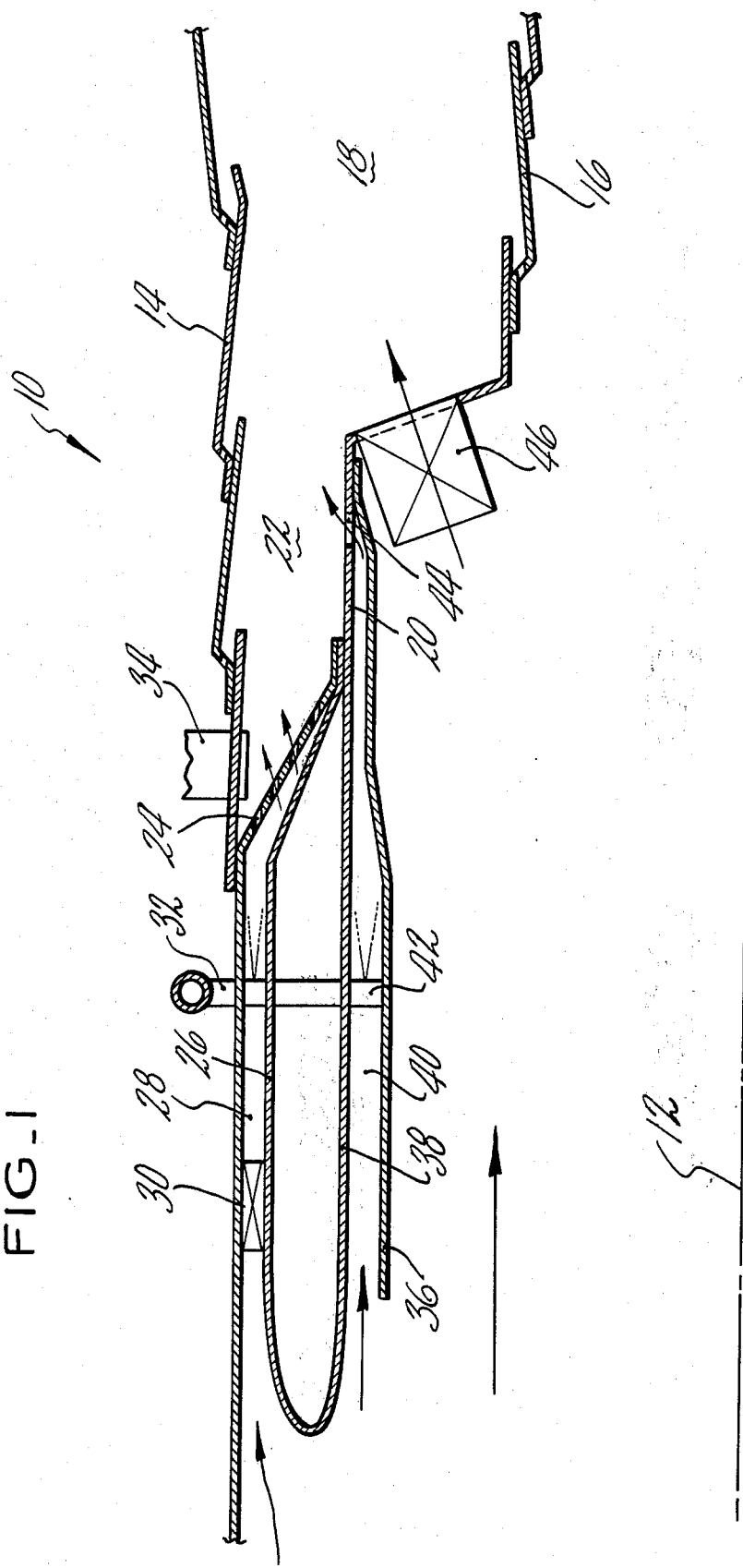
FIG. 1 is a cross-sectional showing of one modification of the combustion chamber.

Referring to FIG. 1 we see a cross-sectional showing of the top half of one of the embodiments of my combustion chamber 10, which is preferably of circular cross section and concentric about combustion chamber center line or axis 12. It should be borne in mind that combustion chamber 10 may be of either the can-type wherein a plurality of such cans are positioned circumferentially about the engine axis between the compressor and turbine of a conventional turbojet engine or may be a single, annular combustion chamber joining the compressor to the turbine in a conventional turbojet engine. Outer wall member 14 and inner wall member 16 are of circular cross section and concentric about axis 12 so as to define annular main combustion zone or chamber 18 therebetween. Wall member 14 cooperates with wall member 20 to define annular pilot combustion zone 22 therebetween so that zone 22 and 18 are joined annuli. Pilot flameholder 24 may be of any design but is preferably a perforated plate member extending between wall members 14 and 20 across the inlet of pilot combustion zone 22 so as to provide a stagnation zone therein to support continuous combustion in the pilot combustion zone 22. Wall member 14 cooperates with wall member 26 to define annular passage 28 therebetween, which has a plurality of circumferentially distributed swirl vanes 30 extending thereacross and a plurality of primary fuel injection nozzles 32 distributed circumferentially therearound so that pilot air from the turbojet engine (not shown) passes over swirl vanes 30 in passing through annular passage 28 and then has pilot fuel injected thereinto so as to form a premixed pilot fuel-air mixture swirling concentrically about axis 12 as it passes through flameholder 24 and is ignited by ignitor 34 to produce combustion in the pilot zone which is swirling about axis 12 and the pilot products of combustion so created are similarly swirling for passage into the main combustion chamber 18 in such swirling fashion.

Duct member 36 cooperates with duct member 38 to define annular passage 40 therebetween located concentrically about axis 12 and having an open forward end to receive engine air, and also having a plurality of circumferentially positioned fuel nozzles 42 therein for injecting a uniform circumferential pattern of fuel into the air passing through passage 40 for mixing therewith in passage 40 to form a uniform fuel-air mixture circumferentially about passage 40. Fuel is injected through secondary fuel nozzle 42 in sufficient quantity with respect to the air passing through passage 40 that a fuel-rich, premixed secondary fuel-air mixture is formed in passage 40, having an ER of about as high as three or higher. This premixed secondary fuel rich-air mixture is discharged into pilot combustion zone 22 through a plurality of circumferentially distributed and spaced and radially oriented fuel injection apertures 44, which are as many as sixty in number so as to provide a uniform premixed mixture of secondary fuel-air about the circumference of the pilot combustion zone 22 so that a circumferentially uniform and well mixed fuel-air mixture is introduced to the combustion zone 22. The size of apertures 44 determines the ER of the secondary fuel-air mixture. As the swirling products of combustion from zone 22 mix with the secondary fuel-air mixture so injected, the fuel is flash vaporized so as to form a fuel-rich mixture of vaporized fuel and the products of combustion which are preferably swirling about axis 12 and have an oxygen content too low for autoignition until a selected ignition lag or time delay expires. This vaporized, swirling, fuel rich-products of combustion mixture is introduced to main combustion chamber 18 where it rapidly mixes with main combustion air which is injected into the main combustion chamber 18 through a plurality of discrete swirlers 46, which are circumferentially spaced and oriented about combustion zone 18 so as to discharge thereinto a plurality of discrete and swirling combustion air columns for rapid mixing with the vaporized fuel-products of combustion mixture to bring the oxygen content thereof rapidly to autoignition at ER less than one and rapid diffusion combustion in the main combustion zone 18. Due to the swirling condition of combustion air from 46 and the vaporized fuel-rich mixture, molecular mixing will occur between the fuel and air. The addition of combustion air also establishes a new ignition lag of shortened duration to accelerate autoignition. In conventional fashion, dilution air is introduced downstream of the main combustion zone 18 to protect the turbine from excessive temperatures.

Duct members 14, 16, 20, 26, 36 and 38 are preferably of circular cross section and concentric about axis 12.

While secondary fuel-air mixture injection apertures 44 and swirlers 46 are shown in the inner wall of their respective combustion zones, it should be borne in mind that they could have been in the outer wall thereof, or in both inner and outer walls thereof.

It will be noted that in the FIG. 1 construction, a premixed pilot fuel-air mixture is introduced to pilot combustion zone 22 at an equivalence rate of about one so as to establish and maintain continuous combustion therein and discharge therefrom as pilot products of combustion which are swirling about axis 12. Also, a premixed and fuel rich secondary fuel-air mixture is uniformly distributed into pilot zone 22 for rapid mixing and flash vaporization with the hot pilot products of combustion to produce a fuel-rich, vaporized fuel-product of combustion mixture having an oxygen content too low for autoignition, which last mixture is mixed with the swirling columns of combustion air in main combustion zone 18 to bring the oxygen content thereof to the autoignition level and for rapid combustion therewith to produce lower emission combustion.

Figure 2:
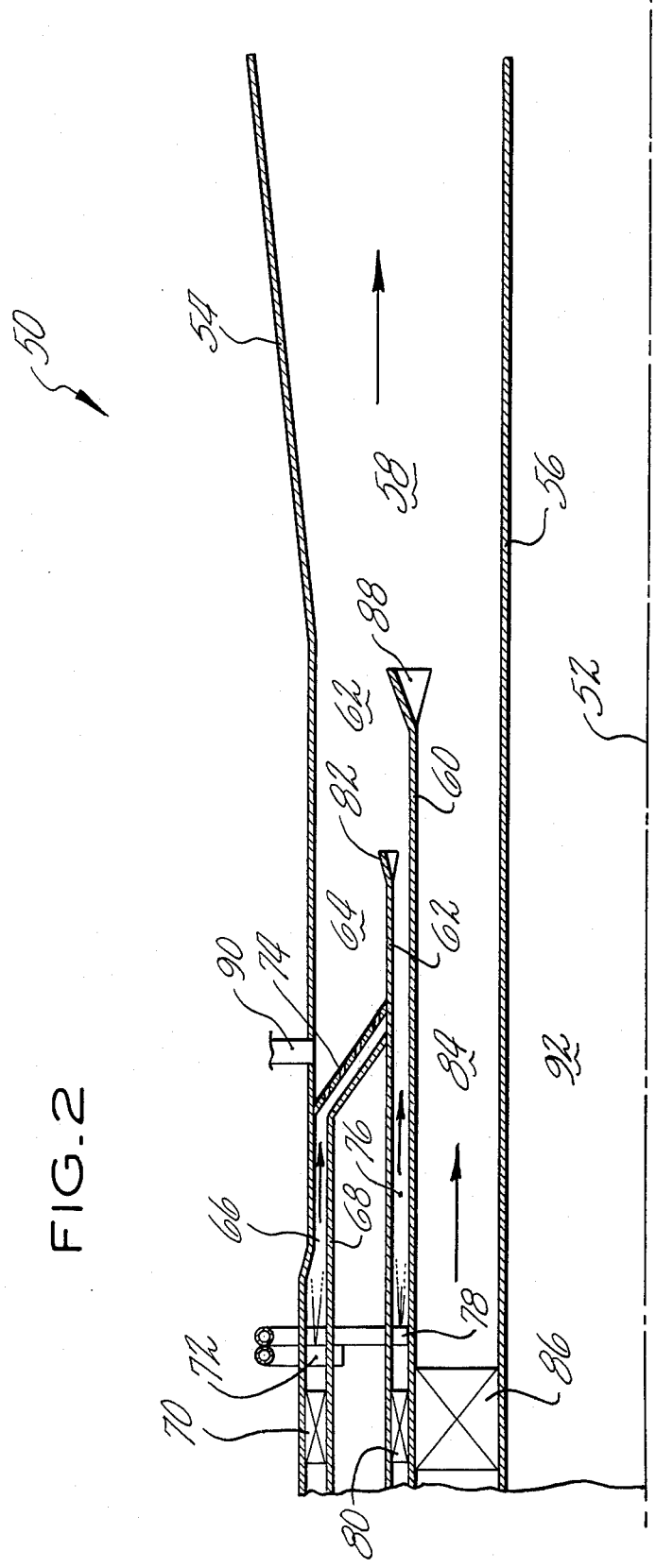
FIG. 2 is a cross-sectional showing of a second modification of the combustion chamber.

In the FIG. 2 embodiment, combustion chamber 50 is of generally circular cross section and concentric about axis 52. Concentric duct members 54 and 56 form annular main combustion zone 58 therebetween, while duct members 54 and 60 cooperate to define annular secondary fuel vaporization zone 62 therebetween, while duct members 54 and 62 cooperate to define annular pilot combustion zone 64 therebetween. Zones 64, 62 and 58 are axially displaced and joined as shown. Air from the compressor portion of a turbojet engine (not shown), or other source, passes through annular passage 66, defined between wall members 54 and 68 and passes over a plurality of circumferentially distributed turning vanes 70 and has primary or pilot fuel injected thereinto by fuel injection means 72, which are circumferentially distributed about passage 66, so as to provide a premixed pilot fuel-air mixture which is swirling about axis 52 to flameholder 74, which extends between walls 54 and 62 to define the upper end of the pilot combustion zone 64. Flameholder 74 may be of any conventional design but is preferably a a perforated plate. Secondary air from the engine or other source passes through annular passage 76 defined between walls 60 and 62 and has fuel injected thereinto through a plurality of circumferentially distributed fuel nozzles 78 and passes over a plurality of circumferentially positioned turning vanes 80 so that a swirling secondary fuel-air mixture passes through annular passage 76 and over trigger mechanism 82 into secondary fuel vaporization zone 62. Fuel is injected into passage 76 in sufficient quantity that the secondary fuel-air, premixed mixture flowing into zone 62 is fuel rich having an ER of about three or higher.

Primary air from the engine or other source passes through annular passage 84 defined between ducts 56 and 60, has swirl imparted thereto concentric about axis 52 in passing over circumferentially positioned swirl vanes 86, and then passes over trigger mechanism 88 before entry into main combustion chamber 58.

In the FIG. 2 construction, the premixed pilot fuel-air mixture is ignited by igniter 90 and provides sustained combustion in pilot combustion zone 64 and discharges pilot products of combustion which are swirling about axis 52 into secondary fuel vaporization zone 62. The fuel-rich secondary fuel-air mixture from passage 76 is also swirling about axis 52 as it passes into zone 62 where it rapidly intermixes and is flashed vaporized with the products of pilot combustion to product a fuel-rich, vaporized fuel-air mixture of sufficiently low oxygen content so as not to be autoignitable at the point of swirling discharge into main combustion zone 58. The primary air from passage 84 is also introduced in swirling fashion about axis 52 to the main combustion zone where it mixes with the aforementioned vaporized fuel-air mixture to bring its oxygen content to autoignition rapidly and to produce rapid combustion of the diffusion burning type therein, with attendant low emission.

Triggers 82 and 88 are preferably corrugated rings supported concentrically about axis 52 and consisting of corrugations which increase in amplitude in a downstream direction and which serve to accelerate mixing between the swirling fluids flowing across the outer and inner surfaces thereof. Triggers 82 may be as described as any of the types taught in U.S. Pat. No. 3,788,065.

Dilution air may be passed through passage 92 within duct 54 for diluting the main combustion zone products of combustion. In the alternative, passage 84 may be of circular cross section and concentric about axis 52, with duct 56 eliminated.

In both the FIG. 1 and FIG. 2 embodiments, approximately 1/5 to 1/4 of the total fuel flow is injected in premixed fashion into the pilot combustion zone, while the remainder of the fuel flow is injected into the fuel-rich secondary fuel vaporization zone. In both constructions, a circumferentially uniform premixed mixture of fuel and air is injected into the pilot and main combustion zones.

Both FIG. 1 and FIG. 2 embodiments of the combustion chamber includes the benefits of premixed combustion and flash vaporization. With respect to the benefits of premixed combustion, both embodiments provide good control of the mixing of both fuel-air mixtures, pilot and secondary, so as to keep them in a fully burnable range at all time. Had the injection of either the pilot or secondary fuel been by discrete fuel jets, poor mixing would have occurred at low power, resulting in poor combustion with carbon monoxide and unburned hydrocarbons resulting. From a flash vaporization standpoint, the vaporized fuel is capable of burning in high velocity air so that in these combustion chambers, the engine air is subjected to NOx creating temperatures for minimal periods of time, hereby reducing NOx emissions.

As used herein, diffusion burning means combustion of the fuel and air following autoignition in the main combustion chamber at the region of diffusion between the vaporized fuel and the combustion air. This produces very rapid and complete combustion.

From an operations standpoint, probably operation of pilot zone combustion only would take place during low power regimes, such as idle, while both pilot combustion and main combustion zone operation will take place at higher power requirements, such as sea level take-off where the maximum peak performance is required. For maximum peak performance, the pilot combustion chamber would be lit off and the secondary fuel-air mixture would be commenced to flow until the desired fuel-rich ER is attained. Experience has shown that the more primary air is introduced to the main combustion chamber, the better are the emission results. When we back off from maximum peak performance in this combustion chamber we reduce the secondary fuel flow, the secondary airflow remaining constant, so that the ER of the secondary fuel-air mixture being introduced to the pilot combustion zone reduces but will be introduced to the pilot combustion zone as a burnable mixture, thereby reducing carbon monoxide and unburned hydrocarbon formation.

The combustion chamber constructions shown in FIGS. 1 and 2 may take advantage of controlled ignition lag to assist in establishing low emission combustion. In this connection, it must be borne in mind that autoignition in a fuel-air mixture is brought about by a combination of oxygen content, temperature above the vaporization temperature, ER of the mixture, and time. For any given oxygen content in a fuel-air mixture which is at a temperature high enough to vaporize the fuel, autoignition will occur after the elapsing of a specified period of time, called the ignition lag or ignition delay time. By control of oxygen content, temperature, and ER, this ignition lag or time delay can be controlled. These combustion chambers may take advantage of this characteristic of a fuel-air mixture to first establish a selected ignition lag at the time we inject the premixed secondary fuel-air mixture so that the fuel will vaporize rather than burn as droplets. Thereafter, as we introduce the vaporized, vitiated, swirling fuel rich-air mixture into the main combustion zone, we also introduce swirling combustion air into the main combustion zone to effect molecular mixing between the fuel and air due to the swirling qualities of the two streams and we also raise the oxygen level of the new mixture to establish a new ignition lag to accelerate autoignition so that autoignition takes place in the main combustion zone at the desired time and hence location within the combustion zone. The introduction of the swirling combustion air also reduces the ER of the mixture so that autoignition occurs at an ER less than one to produce lean, rapid combustion with its attendant low emission. It will therefore be seen that ignition lag is established and controlled to obtain low emission benefits.

To be more specific with respect to ignition lag control, when the hot, swirling, fully combusted pilot exhaust gases of reduced oxygen content have the high ER secondary fuel-air premixed mixture introduced thereinto, the heat of the pilot exhaust gases cause the fuel droplets to vaporize but, since the swirling mixture formed by the pilot exhaust gases and premixed secondary fuel-air mixture is of reduced oxygen content, i.e., vitiated, autoignition thereof will not take place until a first ignition lag time elapses. This vitiated, vaporized swirling, fuel rich-air mixture would eventually autoignite when the original ignition lag elapsed. This is not permitted to happen, however, because we want to control the time of autoignition and hence the location in the engine of combustion and emission therefrom. We accomplish this ignition lag control by introducing swirling combustion air into the main combustion zone to mix rapidly therein with the swirling, vitiated, vaporized fuel rich-air mixture to thereby cause molecular mixing of the fuel and air and to also increase the oxygen content of the mixture and reduce its ignition lag to effect autoignition at the precise time and engine location desired and with the ER of the mixture less than one so as to achieve lean, rapid, low emission combustion with the engine air subjected to the NOx creating temperature for a minimum period of time.

Figure 3:
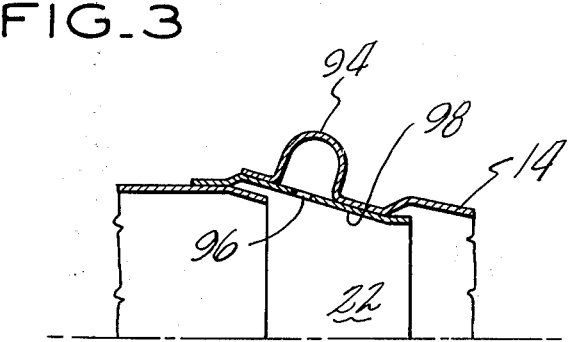
FIGS. 3 and 4 show modified forms of vaporized fuel injection mechanisms which could be used in this combustion chamber.
Figure 4:
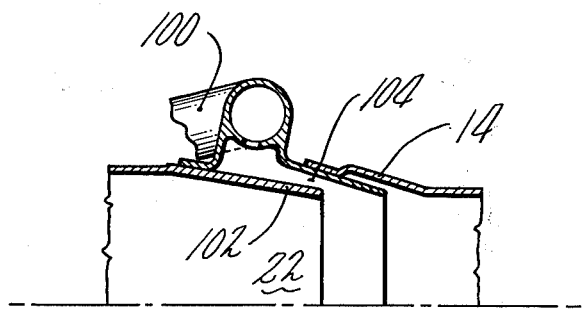

FIGS. 3 and 4 demonstrate alternate methods of introducing vaporized fuel into combustion zone 22, for discharge therefrom into zone 18. In the FIG. 3 construction, liquid fuel is pumped through manifold member 94 which is in contact with combustion chamber wall 14 or, as illustrated, combustion chamber wall 14 forms one wall boundary of manifold 94. A plurality of apertures or holes 96 place the interior of manifold 94 into communication with combustion chamber zone 22 and are sized to produce a low pressure drop in the fuel passing through apertures 96 to form a fuel film along the inner surface 98 of combustion chamber wall 14 and be fully vaporized by this contact with the hot combustion chamber wall 14. In the FIG. 4 construction, a very rich fuel-air mixture is injected into selectively bent tube 100, which is connected to combustion chamber wall 14 as shown. The fuel rich-air mixture passing through bent tube 100, in view of the shape of the tube, enters the combustion chamber with an axial as well as a rotational velocity component to facilitate uniform fuel distribution. Any liquid fuel which has not vaporized within tube 100, which passes in close proximity to combustion chamber wall 14, will impinge against deflector wall or plate 102, thereby causing the fuel to flash vaporize upon impingement with deflector 102 for discharge therefrom through passage 104 into the interior 22 of the combustion chamber.

I wish it to be understood that we do not desire to be limited to the exact details of construction shown and described, for obvious modifications will occur to a person skilled in the art.

I claim:
1. The method of producing low emission combustion comprising the steps of:
   A. establishing pilot combustion in annular form about an axis so that the products of combustion thereof are swirling about the axis,
   B. introducing a uniform pattern of main combustion premixed, fuel rich-air mixture having an equivalence ratio of about 3 or higher into the swirling pilot products of combustion for fuel flash vaporization therein and for the formation therewith of a swirling, fuel-rich mixture of vaporized fuel and air having an oxygen content too low for autoignition and combustion, and
   C. introducing swirling main combustion air into the swirling vaporized fuel-air mixture to quickly mix therewith and raise the oxygen content thereof sufficiently to produce autoignition and rapid diffusion burning therewith.
2. The process according to claim 1 wherein the premixed secondary fuel-air mixture is injected into the annular combustion zone so as to establish a circumferentially uniform pattern of substantially radially directed streams of premixed, fuel rich-air mixture directed into the pilot combustion zone, and wherein the main combustion air is injected as a plurality of circumferentially spaced and oriented individual swirling air streams which are positioned uniformly about the axis.
3. The method according to claim 1 wherein the fuel rich-air mixture is injected through an annular opening communicating with the pilot combustion zone and in swirling fashion about the axis, and wherein the main combustion air is injected through an annular opening and in swirling fashion about the axis.
4. The method according to claim 1 wherein approximately one quarter of the total fuel is injected for pilot combustion and the remainder of the total fuel is injected for main combustion.
5. A combustion chamber concentric about an axis and having:
   A. means defining an annular pilot combustion zone concentric about the axis,
   B. means for passing a pilot fuel-air mixture through said pilot combustion zone so that the mixture is swirling about the axis,
   C. means for igniting the swirling pilot fuel-air mixture to produce swirling pilot combustion and vitiated pilot products of combustion swirling about the axis,
   D. means for introducing a premixed, secondary fuel rich-air mixture having an equivalence ratio of about 3 or higher into the downstream portion of the pilot combustion zone and substantially uniformly circumferentially thereabout for mixing with the swirling, vitiated pilot products of combustion and flash vaporization of the fuel to produce a vitiated fuel-rich mixture of vaporized fuel and pilot products of combustion swirling about the axis,

E. means defining an annular main combustion zone downstream of and connected to the pilot combustion zone and concentric therewith about the axis to receive said swirling, vitiated, fuel-rich mixture of vaporized fuel and pilot products of combustion, and F. means for introducing a plurality of circumferentially spaced and disposed columns of swirling cool main combustion air into said main combustion zone for rapid mixing with the swirling, vitiated, vaporized fuel pilot products of combustion mixture to produce autoignition and rapid combustion thereof.

6. A combustion chamber according to claim 5 wherein said secondary fuel-air mixture injection means is a plurality of injection ports positioned uniformly about the circumferential periphery of the pilot combustion zone and spaced, sized and oriented to direct a plurality of radially directed streams of fuel-air mixture evenly distributed circumferentially about the combustion zone to establish a stagnation zone downstream thereof.

7. A combustion chamber according to claim 3 wherein the main combustion air injection means constitutes a plurality of a swirler member positioned circumferentially about and communicating with the main combustion zone to produce a plurality of swirling streams of main combustion air in a circumferentially uniform pattern about the main combustion zone.

8. A combustion chamber according to claim 5 and including means to premix the pilot fuel-air mixture before introduction thereof into the pilot combustion zone.

9. A combustion chamber according to claim 5 and including a flameholder in said pilot combustion zone.

10. A combustion chamber concentric about an axis and including means defining an annular pilot combustion zone at an upstream station joined to an annular secondary fuel vaporization zone, which is, in turn, joined to an annular main combustion zone at a downstream station and including:

A. means to produce swirling combustion and substantially fully combusted products of combustion in said pilot combustion zone swirling about said axis, B. means to introduce a premixed, secondary fuel-rich-air mixture of equivalence ratio of about 3.0 or more into said secondary fuel vaporization zone and uniformly thereabout in swirling fashion about said axis so as to mix with the swirling pilot products of combustion to vaporize the fuel and discharge a vitiated, vaporized, fuel rich-air mixture and swirling about said axis into said main combustion zone, C. means for introducing main combustion air into said main combustion zone in swirling fashion about said axis for rapid mixing with the vaporized fuel-air mixture to bring the oxygen content thereof to the point of autoignition at an ER less than 1 and for rapid combustion therewith in diffusion burning fashion in the main combustion zone.

11. A combustion chamber according to claim 10 wherein swirling motion is imparted to the premixed secondary fuel-air mixture by turning vanes, and wherein mixing between the pilot zone products of combustion and the secondary fuel-air mixture is accelerated by passing both fluids over a trigger mechanism which is mounted concentrically about the axis at the upstream end of the secondary fuel vaporization zone.

12. A combustion chamber according to claim 11 wherein the main combustion air is caused to rotate about the axis by turning vanes and where in mixing between the main combustion air and the vaporized fuel-air mixture is accelerated by passing both fluids over a trigger mechanism mounted concentrically about the axis and positioned at the upstream end of the main combustion zone.

13. A combustion chamber according to claim 12 wherein the trigger mechanisms are corrugated ring members having corrugations which increase in radial amplitude in a downstream direction.

14. A combustion chamber according to claim 13 wherein the product parameter $\rho V_t^2$ of the secondary fuel-air mixture entering the secondary fuel vaporization zone is higher than the corresponding product parameter of the pilot zone products of combustion entering that zone, and wherein the product parameter $\rho V_t^2$ of the main combustion air entering the main combustion chamber is higher than the product parameter of the vaporized fuel-air mixture entering the main combustion zone so as to accelerate the mixing between these fluids, wherein $\rho$ is fluid density and $V_t$ is fluid velocity tangential to the axis.

15. A low NOx combustion chamber comprising:

A. means to produce hot, swirling, fully combusted, pilot exhaust gases of reduced oxygen content and alone fuel vaporization temperature including:
   1. a pilot combustion chamber,
   2. means to inject a premixed fuel-air mixture of ER about 1 into said pilot combustion chamber, and
   3. means to ignite said pilot mixture, B. means to inject a premixed fuel-air mixture of ER about 3 or above and of uniform pattern into the swirling pilot exhaust gases in selected quantity to produce a first swirling mixture of fuel and air of reduced oxygen content so that the first swirling mixture has a first ignition delay time to prevent autoignition of the fuel droplets, said first swirling mixture also having a selected temperature to vaporize the fuel so that said second swirling mixture is a vaporized, swirling fuel-air mixture having a reduced oxygen content to produce autoignition at the culmination of the first time delay, and C. means to mix a selected quantity of swirling combustion air with the first swirling mixture to effect molecular mixing between the fuel and air since both the first mixture and combustion air are swirling, and in selected quantity to produce a second swirling, vaporized fuel-air mixture of oxygen level greater than that of said first mixture to effect a new and reduced ignition delay time so as to autoignite the second mixture at an ER less than 1 and at a time sooner than the expiration of the first ignition delay time to thereby reduce the dwell time of the engine air at NOx creating temperature.

16. The method of producing low NOx combustion in a combustion chamber comprising the steps of:

A. producing hot, swirling, fully combusted, pilot exhaust gases of reduced oxygen content and of a temperature above the vaporization temperature of the fuel to be utilized in the combustion chamber, B. injecting a premixed fuel-air mixture of ER about 3 or above into the swirling pilot exhaust gases in selected quantity to produce a first swirling mixture of fuel and air of reduced oxygen content so that the first swirling mixture has a first ignition delay time to prevent autoignition of the fuel droplets, said first swirling mixture also having a selected temperature to vaporize the fuel so that said first swirling mixture is a vaporized, swirling fuel-air mixture having a reduced oxygen content to produce autoignition at the culmination of the first time delay, and C. mixing a selected quantity of swirling combustion air with the first swirling mixture to effect molecular mixing between the fuel and air since both the first mixture and combustion air are swirling, and in selected quantity to produce a second swirling, vaporized fuel-air mixture of oxygen level greater than that of said first mixture to effect a new and reduced ignition delay time so as to autoignite the second mixture at an ER less than 1 and at a time sooner than the expiration of the first ignition delay time to thereby reduce the dwell time of the engine air at NOx creating temperature.

* * * * *

UNITED STATES PATENT OFFICE
CERTIFICATE OF CORRECTION

PATENT NO. : 3,973,390
DATED : August 10, 1976
INVENTOR(S) : Ronald A. Jeroszko

It is certified that error appears in the above-identified patent and that said Letters Patent are hereby corrected as shown below:

| | |
|---|---|
| Column 5, line 11 | Delete "62" and insert --61-- |
| Column 5, line 52 | Delete "flashed" and insert --flash-- |
| Column 5, line 53 | Delete "product" and insert --produce-- |
| Column 9, line 25 | Delete "3" and insert --5-- |
| Column 10, line 31 | Delete "alone" and insert --above-- |

Signed and Sealed this

Eighteenth Day of January 1977

[SEAL]

Attest:

RUTH C. MASON
Attesting Officer

C. MARSHALL DANN
Commissioner of Patents and Trademarks